United States Patent [19]

Firey

[11] Patent Number: 4,653,437
[45] Date of Patent: Mar. 31, 1987

[54] PULVERIZED CHAR FUEL INJECTOR

[76] Inventor: Joseph C. Firey, P.O. Box 15514, Seattle, Wash. 98115-0514

[21] Appl. No.: 830,508

[22] Filed: Feb. 14, 1986

[51] Int. Cl.⁴ .................... F02D 19/04; F02B 45/02
[52] U.S. Cl. ......................................................... 123/23
[58] Field of Search .............. 123/1 R, 23, 24; 60/39, 60/464

[56] References Cited

U.S. PATENT DOCUMENTS

| | | |
|---|---|---|
| 1,586,508 | 5/1926 | Brutzkus ............................ 123/64 |
| 2,172,124 | 9/1939 | Gilbert ............................... 123/24 |
| 2,396,524 | 3/1946 | Nettle ................................ 123/23 |
| 2,625,141 | 1/1953 | Berlyn ............................... 123/23 |
| 3,981,277 | 9/1976 | Abom ................................ 123/23 |
| 4,059,078 | 11/1977 | de la Rosa ...................... 123/25 K |
| 4,204,506 | 5/1980 | Bowing ............................. 123/23 |
| 4,372,256 | 2/1983 | Firey ................................. 123/23 |
| 4,381,745 | 5/1983 | Firey ................................ 123/294 |
| 4,412,511 | 11/1983 | Firey ................................. 123/23 |
| 4,584,970 | 4/1986 | Firey ................................. 123/23 |

Primary Examiner—William A. Cuchlinski, Jr.

[57] ABSTRACT

A pulverized fuel injector is described capable of injecting and dispersing pulverized char fuels into an engine combustion chamber.

24 Claims, 6 Drawing Figures

PULVERIZED CHAR FUEL INJECTOR

CROSS REFERENCE TO RELATED APPLICATION

The pulverized fuel injector invention described herein is related to the Crossed Pulse Engine Atomizer described in my earlier filed U.S. patent application Ser. No. 06/671686, filed Nov. 15, 1984 now U.S. Pat. No. 4,592,328.

BACKGROUND OF THE INVENTION

1. Field of the Invention

This invention is in the field of pulsed injectors of dry pulverized solids, and more specifically pulsed injectors of dry pulverized char fuel as might be used, for example, in a piston internal combustion engine burning dry pulverized char fuel where combustion is intended to be intermittent and not continuous.

2. Description of the Prior Art

Efforts to burn pulverized coal in diesel engines have been made for many years as discussed in reference A, B, and C and the references referred to therein. Much of the recent efforts have been directed toward using slurries of pulverized coal suspended in liquid hydrocarbon or water, as discussed in references D, E, F, G, H, I. Some past efforts have been directed toward using dry pulverized coal, but these have been generally unsuccessful unless pilot injection of diesel fuel or other ignitable fuel is utilized to initiate the burning of the dry pulverized coal. Additionally, an air blast injector is needed in order to disperse the dry pulverized coal throughout the combustion chamber air mass. Thus, for direct burning of dry pulverized coal, an air compressor is needed to furnish the fuel injector blast air and this reduces the power output and efficiency of the engine. It would thus be of great benefit if a dry pulverized coal injector were available capable of adequately dispersing the pulverized coal into the combustion chamber which required only small quantities of blast air.

Methods for burning non-pulverized char fuels in lump or pellet form in piston type internal combustion engines are described in references J and K.

The term, internal combustion engine mechanism, is used herein and in the claims to mean all those portions of prior art internal combustion engines except the fuel supply and mixing systems and spark ignition system, if used, as described in U.S. Pat. No. 4,412,511 (reference J), column 1, line 65, through column 2, line 45, and also to mean a free piston mechanism as described in U.S. Pat. No. 4,372,256, column 1, line 55 through column 2, line 6 and this material from U.S. Pat. No. 4,412,511 and U.S. Pat. No. 4,372,256, is incorporated herein by reference thereto.

The term "char fuel" is used herein and in the claims to mean any fuel, capable of reacting chemically with oxygen to release chemical energy, whose usual physical state is wholly or largely solid or which leaves behind a solid residue after volatile matter has been evolved as defined further in U.S. Pat. No. 4,372,256, column 7, lines 19 through 53, and this material is incorporated herein by reference thereto.

The term "pulverized char fuel" is used herein and in the claims to mean char fuel particles whose size has been sufficiently reduced by grinding or other means that the particle is suspendable within the air or gas flow being used to disperse it. In effect, the aerodynamic forces acting on the particle during injection at least equal the particle weight for pulverized char fuel. The term "dry pulverized char fuel" is used herein and in the claims to mean pulverized char fuel not in a slurry form with any liquid.

The term "ignitable fuel" is used herein and in the claims to mean any liquid or gaseous fuel which can be spark ignited after being mixed with air or a gas containing appreciable oxygen gas. Gasoline, diesel fuel, natural gas, producer gas, etc., are examples of ignitable fuels.

The term "oxygen" and "oxygen gas" refer to molecular oxygen as $O_2$ and a gas containing oxygen in appreciable quantities, such as air, is referred to as a gas containing appreciable oxygen whereas a gas, such as producer gas, containing very little oxygen is referred to as a gas essentially free of oxygen even though it may contain appreciable portions of atoms of oxygen combined with carbon and hydrogen.

The term "start of each combustion process" is used herein and in the claims to mean that time at which fuel and air are to be mixed together in a combustion chamber for each pulse of burning where pulsating combustion is being utilized.

Prior Art References:

A. "Solid Fuel Applications to Transportation Engines," R. L. Rentz, T. J. Timbario, and R. A. Renner, ASME Paper 810445, 1981.

B. "Coal Fueled Diesel Engines," F. Robben, SAE Paper 831747, 1983.

C. "The Combustion Characteristics of Coal Slurry Fuels in Diesel Engines: Detailed Measurements and Analysis," L. P. Nelson, M. P. Heap, P. W. Sampson, and W. R. Seeker, ASME Paper 85-DGP-19, 1985.

D. "Performance of Coal Slurry Fuel in a Diesel Engine," K. Tatajah and C. D. Wood, SAE Paper 800329, 1980.

E. "Performance of a Diesel Engine Operating on Raw Coal-Diesel Fuel Slurries," H. P. Marshall, S. M. Bhat, S. T. Mulvaney, J. F. Sevelli, SAE Paper 810253, 1981.

F. "Diesel Engine Injection and Combustion of Slurries of Coal, Charcoal and Coke in Diesel Fuel," T. W. Ryan III, L. G. Dodge, SAE Paper 840119.

G. "A Combustion and Wear Analysis of a Compression-Ignition Engine Using Coal Slurry Fuels," J. M. Clingenpeel, M. D. Gurney, D. B. Eccleston, ASME Paper 84-DGP-8.

H. "A Program to Examine the Uses of Coal Slurry Fuels In Diesel Engines," M. D. Gurney, J. M. Clingenpeel, D. B. Eccleston, ASME Paper 84-DGP-9.

I. U.S. Pat. No. 4,381,745, issued May 3, 1983 to J. C. Firey.

J. U.S. Pat. No. 4,412,511, issued Nov. 1, 1983 to J. C. Firey.

K. U.S. Pat. No. 4,372,256, issued Feb. 8, 1983 to J. C. Firey.

SUMMARY OF THE INVENTION

Pulverized char fuel injectors of this invention use a charge of high pressure driver gas to inject the pulverized fuel into an engine combustion chamber. The char fuel is prepressurized with driver gas prior to injection and the subsequent outflow of this driver gas from the char fuel pores aids in dispersing the pulverized particles throughout the combustion chamber. When air is used as driver gas, pilot injection of an ignitable fuel into the driver gas and spark ignition thereof before injection improves pulverized fuel particle dispersion and preheats the char fuel to its rapid burning temperature.

BRIEF DESCRIPTION OF THE DRAWINGS

One particular example of a pulverized char fuel injector of this invention is shown in FIG. 1.

A means for reloading pulverized fuel into a pulverized fuel injector is shown in FIG. 2.

Figure 3:
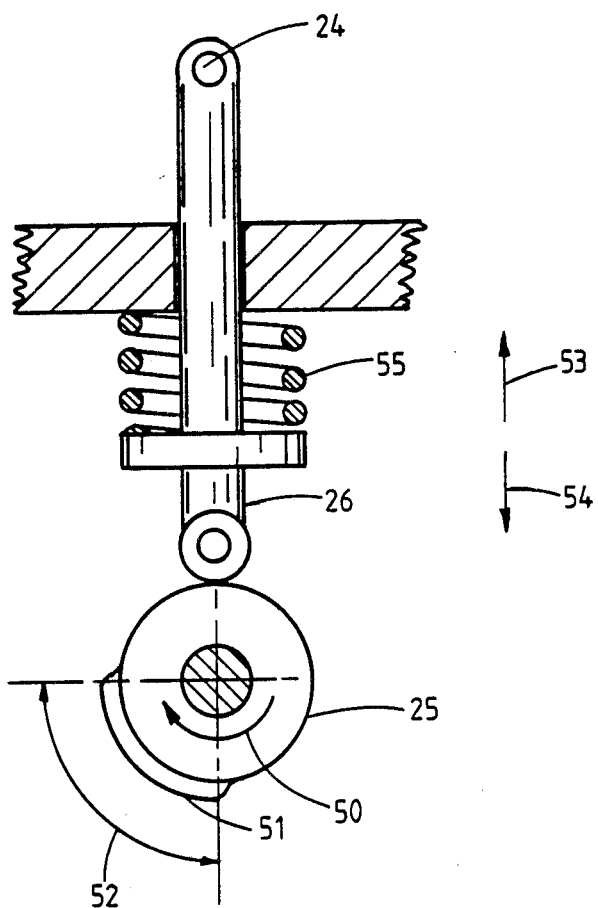

An example mechanical drive means for driving the connecting means of a pulverized char fuel injector is shown in FIG. 3.

Figure 2:
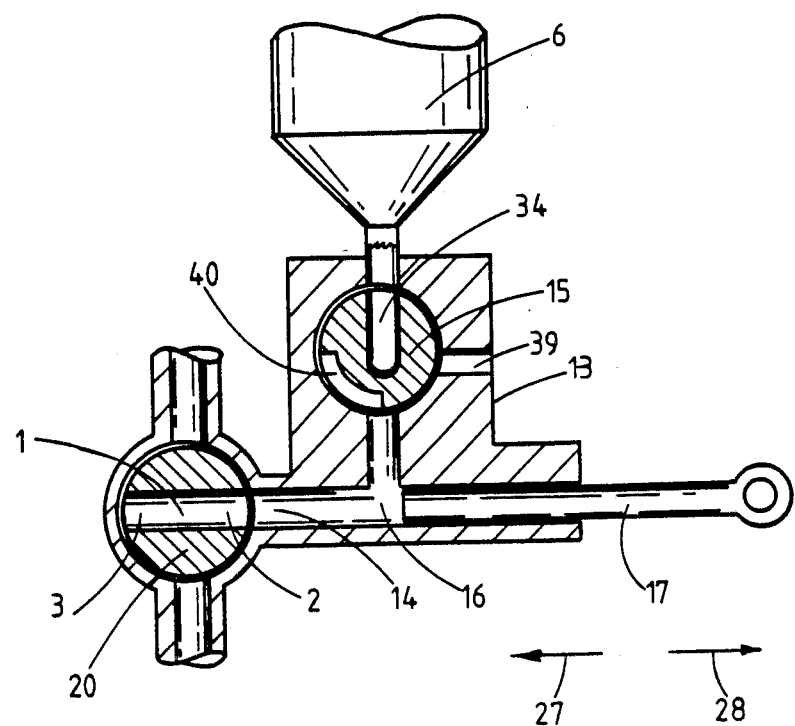
Figure 4:
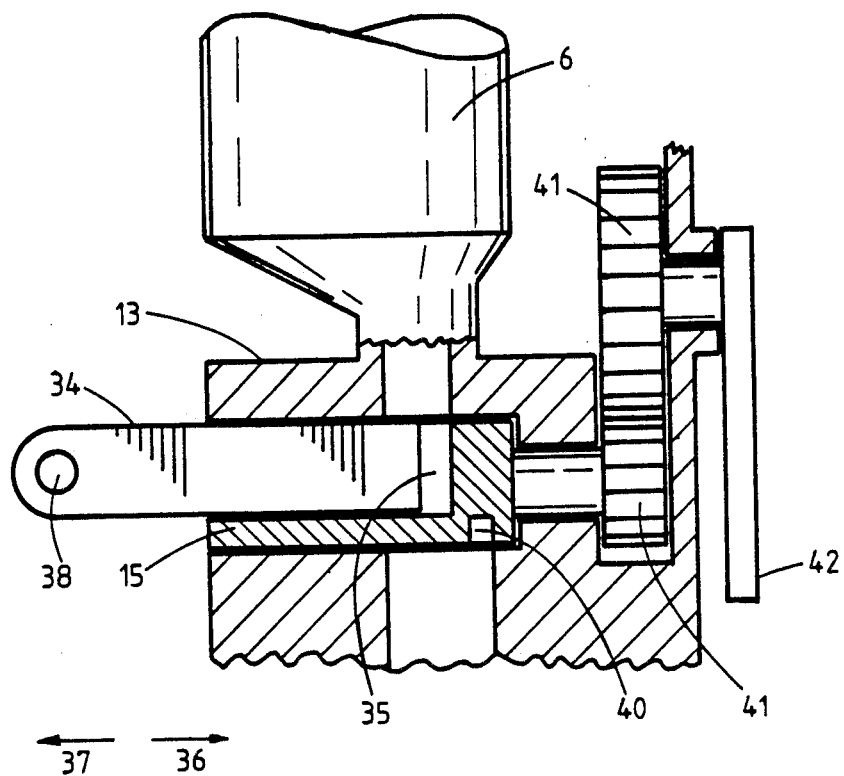

A means for adjusting the quantity of pulverized fuel reloaded into a pulverized fuel injector by a reload means such as that shown in FIG. 2 is shown in FIG. 4.

Figure 5:
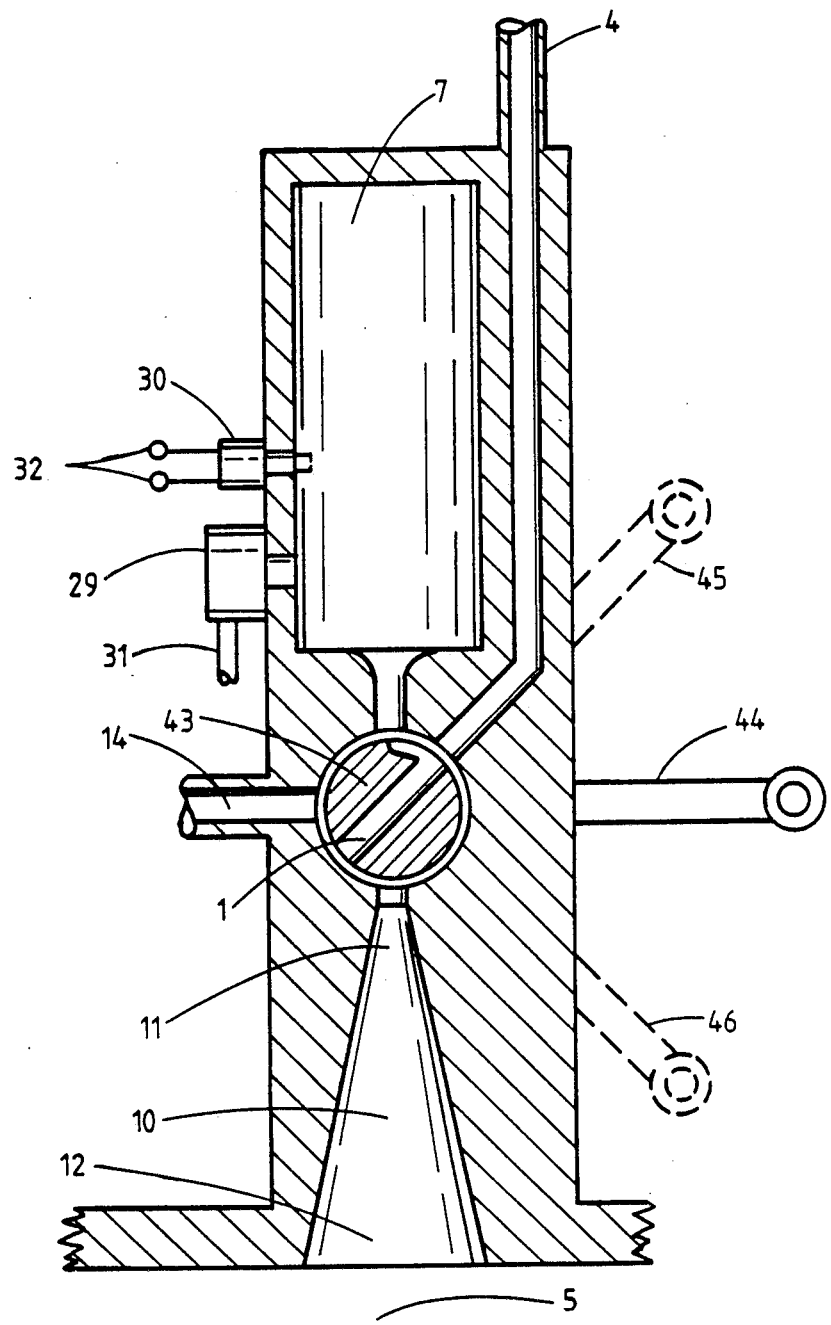

A preferred form of pulverized char fuel injector of this invention is shown in FIG. 5.

Figure 6:
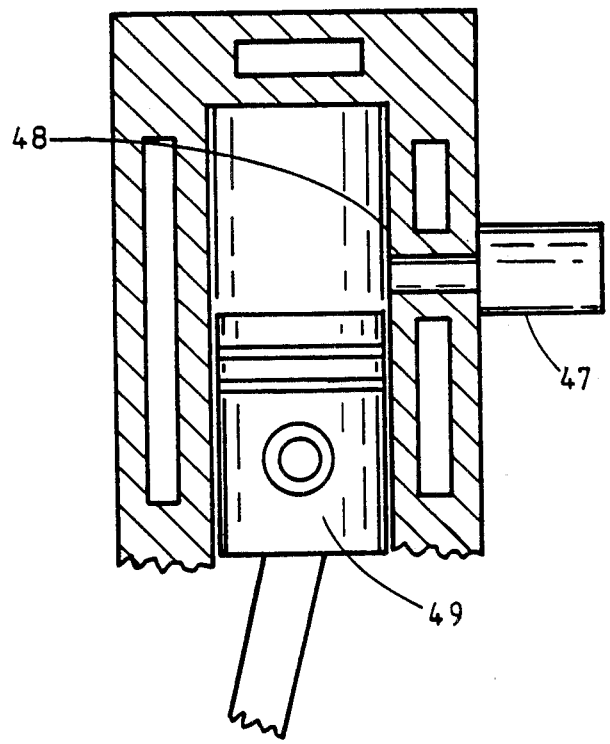

An example application of a pulverized char fuel injector to an internal combustion engine is shown in FIG. 6.

DESCRIPTION OF THE PREFERRED EMBODIMENTS

Figure 1:
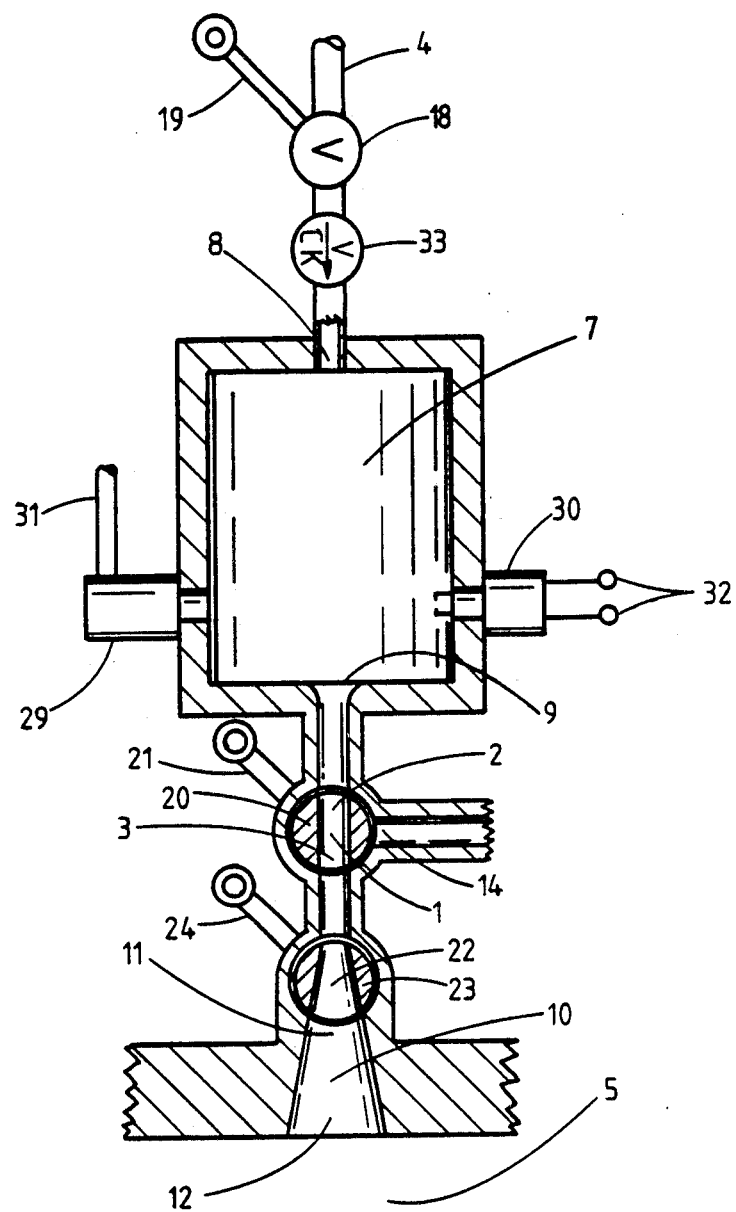

One example of a pulverized fuel injector of this invention is shown in cross section in FIG. 1 and FIG. 2 and comprises the following elements:

A. a means for containing, 1, a portion of pulverized char fuel and comprising an inlet, 2, for char fuel addition thereto, and an outlet, 3, for char fuel removal therefrom;

B. a source of high pressure driver gas, 4, which will commonly be compressed air, at a pressure greater than the pressure prevailing in the combustion chamber, 5, during injection;

C. a source of pulverized fuel particles, shown at, 6, in FIG. 2 as a bin full of pre-pulverized char fuel particles;

D. a means for containing, 7, a charge of the high pressure driver gas and comprising an inlet, 8, and an outlet, 9;

E. a dispersing nozzle passage, 10, comprising a nozzle inlet, 11, and a nozzle outlet, 12, connected into the combustion chamber, 5;

F. a means for reloading, 13, another portion of pulverized fuel from the source, 6, into the fuel container, 1, and comprising a reload outlet, 14; the particular example reload means of FIG. 2 and FIG. 4 comprises a transfer means, 15, to transfer fuel particles from the source, 6, into a reload chamber, 16, and a ram means, 17, to force this transferred fuel portion into the fuel container, 1, via the reload outlet, 14, and the container inlet, 2; this reload transfer means, 15, can be rotated from connection to the supply hopper, 6, into connection to the reload chamber, 16, as via the gears, 41, and drive link, 42; alternative reload means can also be used;

G. a means for connecting, 18, the driver gas container, 7, inlet, 8, to the source, 4, of high pressure driver gas, such as a valve opened and closed via the handle, 19;

H. a means for connecting the pulverized fuel container, 1, to the reload means outlet, 14, as, for example, by rotating the container body, 20, via the handle, 21;

I. a means for connecting the inlet, 2, of the fuel container, 1, to the outlet, 9, of the driver gas container, 7, as by rotating the container body, 20, via the handle, 21, in a direction opposite to that used when connecting for reload;

J. a means for connecting, 22, the fuel container outlet, 3, to the dispersing nozzle inlet, 11, as, for example, by rotating the nozzle valve body, 23, via the handle, 24;

K. a means for driving all of these several means for connecting and means for reloading so that the following described injection process is carried out, in the listed time order, at the start of each combustion process in the combustion chamber, 5; this driving means is not shown in FIGS. 1 and 2 but can be any of several different kinds of mechanical or electrical or pneumatic or hydraulic drive means, such as a cam, 25, cam follower, 26, connected to the handle, 24, of a connecting means as is shown in FIG. 3 and will be described hereinafter:

(1) First, the pulverized fuel container, 1, is connected to the outlet, 14, of the reload means, 13, as for example by rotating the container body 20, into the position shown in FIG. 2, and a portion of pulverized fuel is reloaded into the container, 1, as by rotating the transfer means, 15, and then driving the reload ram, 17, in the reload direction, 27.

(2) Second, the pulverized fuel container, 1, is disconnected from the reload outlet, 14, and connected at its inlet, 2, to the outlet, 9, of the driver gas container, 7, as for example by rotating the fuel container body, 20, into the position shown in FIG. 1, and concurrently the inlet, 8, of the driver gas container, 7, is connected to the source of high pressure driver gas, 4, as by opening the valve, 18. With these connections the driver gas container, 7, is filled with high pressure driver gas and also the pore spaces of the char fuel inside the fuel container, 1, also become filled with high pressure driver gas. The reload ram, 17, is retracted in the direction, 28, and the transfer means, 15, is back rotated into connection with the char fuel hopper, 6, after the container, 1, is disconnected from the reload outlet, 14.

(3) Third, the fuel container outlet, 3, is connected to the inlet, 11, of the dispersing nozzle, 10, as for example by rotating the nozzle valve body, 23, into the position shown in FIG. 1. With this connection the high pressure driver gas in the driver container, 7, flows rapidly through the fuel container, 1, picking up the pulverized char fuel by entrainment, and out via the dispersing nozzle, 10, into the combustion chamber, 5, thus injecting the portion of pulverized fuel into the combustion chamber and dispersing it there into the combustion air.

(4) Fourth, the fuel container outlet, 3, is disconnected from the inlet, 11, of the dispersing nozzle, 10, as for example by rotating the nozzle valve body, 23, ninety degrees from the position shown in FIG. 1.

(5) Fifth, the driver gas container inlet, 8, is disconnected from the source of high pressure driver gas, 4, as by closing the valve, 18, at some time between the connecting of the fuel container outlet, 3, to the dispersing nozzle inlet, 11, and the disconnecting of the container outlet, 3, from the nozzle inlet, 11. Preferably, this disconnecting is done essentially concurrently with the connecting of the container outlet, 3, to the nozzle inlet, 11, in order to reduce the quantity of high pressure driver gas flowing into the combustion chamber during each fuel injection process.

This injection process is repeated at the start of each combustion process in the combustion chamber, 5, by repeating the above-described steps in the time order indicated.

During the third step of this injection process, high pressure driver gas not only flows out of the driver container, 7, into the combustion chamber, 5, but also flows out of the pore spaces of each individual char fuel particle. This outflow of pore gas acts to improve fuel dispersion into the air mass inside the combustion chamber, 5, by forcing the separate fuel particles apart. In this way, improved fuel dispersion is obtained and smaller quantities of high pressure driver gas can be utilized and these are among the beneficial objects of this invention.

The elements of a pulverized fuel injector of this invention listed hereinabove are the minimum elements and all forms of this invention comprise these elements. Some of these elements can be modified in various ways, and some of these elements can be combined into single components performing several functions. Added elements can be advantageously utilized in certain applications. Examples of modified elements, combined elements and added elements will be described hereinafter.

Improved char fuel burning in the combustion chamber and further reduced driver gas quantity requirements can be achieved by using pilot fuel injection and ignition within the driver gas container and using compressed air or a gas containing appreciable oxygen gas as the driver gas source. One example of such a pilot injection and ignition scheme is shown in FIG. 1 and comprises the following added elements:

L. A pilot injector means, 29, for injecting a quantity of ignitable fuel into the driver gas container, 7, from an ignitable fuel source, 31.

M. A spark igniter means, 30, for firing an electric spark within the driver gas container, 7, and comprising an energizing source, 32.

N. A check valve, 33, or other means for preventing back flow of gas from the driver gas container, 7, into the source of high pressure driver gas, 4.

O. The high pressure driver gas is air or other gas containing appreciable oxygen gas.

P. The drive means for driving the several means for connecting also drives the means for injecting an ignitable fuel, 29, and the means for firing an electric spark, 30, so that injection of ignitable fuel followed by an electric spark take place after each connection of the pulverized fuel container inlet, 2, to the driver outlet, 9, and before connection of the fuel container outlet, 3, to the nozzle inlet, 11.

When these added elements are driven as described above, the pilot injected ignitable fuel mixes with the oxygen containing driver gas and is ignited by the electric spark. The resulting burning of the pilot injected fuel elevates the pressure and temperature of the gases inside the driver gas container, 7, and the check valve, 33, prevents reduction of this higher pressure by backflow into the driver gas source, 4. Subsequently, when the fuel container outlet, 3, is connected to the nozzle inlet, 11, as by opening of the valve, 22, the higher pressure burned driver gases create improved gas fuel particle dispersion within the combustion chamber, 5, in part because they flow at higher velocity through the fuel container, 1, and in part because the gases within the pore spaces of the particles of char fuel, being at higher pressure, exit from these pores at higher velocity and thus improve separation between particles. Improved char fuel particle dispersion is thusly obtained within the combustion chamber, 5, for the same pressure and quantity of driver gas from the source, 4, and this is an additional beneficial object achieved by use of these added elements for pilot injection and burning. Alternatively, an equal dispersion of the char fuel particle within the combustion chamber, 5, can be secured with use of a smaller quantity of driver gas from the source, 4, and this is an alternate beneficial object achievable by use of these added elements for pilot injection and burning.

When pilot injection and burning are thusly used, the consequent higher temperature driver gases act to heat up the char fuel particles quickly to their rapid burning temperature during the char fuel injection process, since these hot driver gases are in intimate contact with the particles and flow initially at high velocity relative to these particles. Thus, the char fuel particles enter the combustion chamber, 5, not only well dispersed in the combustion air mass, but also already at their rapid burning temperature so that char fuel particle combustion can commence immediately upon injection. This is a further beneficial object achievable by use of the pilot injection and burning scheme in the driver container, 7, described above. These same beneficial results can alternatively be attained by using a premixed air-ignitable fuel mixture as the high pressure driver gas which is spark ignited as described hereinabove.

Prior art engines and pulsating combustors using dry pulverized char fuels have found pilot injection and ignition of an ignitable fuel necessary to achieve combustion of the char fuel particles. But these prior art schemes have used pilot injection and burning only within the main combustion chamber, 5. As a result, improved char fuel particle dispersion is not obtained and char fuel particle heating to the rapid burning temperature is slow since the pilot injected fuel burned gases are neither in intimate contact with the particles nor possess a high flow velocity relative to the particles.

In many applications it will be necessary to cool the walls of the driver gas container, 7, to avoid weakening of the materials by heating when pilot injection and burning are used as described above. The driver gas container, 7, can be fitted with external air cooling fins or a cooling water jacket for this purpose. Alternatively, cooling can also be achieved by introducing steam or liquid water with the pilot injected fuel. These means for cooling the driver gas container, 7, are not shown in FIG. 2.

Any of various types of liquid or gaseous fuel injectors can be used for the pilot injector means, 29, such as those already in use in diesel and gas engines. Any of various types of spark igniters can be used for the spark igniter means, 30, such as those already in use in gasoline and gas engines.

In most applications fuel burning rate can be controlled by controlling the quantity of char fuel reloaded by the reload means, 13, into the char fuel container, 1, after each combustion process. This reload quantity control can be carried out by various means, and one particular example of a means for adjusting the quantity of pulverized char fuel reloaded is shown partially in FIG. 2 and FIG. 4 and comprises:

a volume control bar, 34, positioned within the reload cavity, 35, of the reload transfer means, 15, and adjustable in the direction, 36, to decrease the reload cavity volume, 35, and hence reload fuel quantity, and adjustable in the direction, 37, to increase the reload cavity volume, 35, and hence reload fuel quantity. Such adjustment of the volume control bar, 34, can be done by hand or by an engine governor acting on the end, 38, of the control bar, 34. Gas pressure within the char fuel container, 1, can be vented prior to reloading via the vent passage, 40, which connects the vent, 39, to the container, 1, just prior to reloading when the transfer means is being rotated to commence reloading.

An example preferred form of pulverized fuel injector of this invention is shown in cross section in FIG. 5, and combines several of the elements of the FIG. 1 example, and comprises the following elements:

a. a source of high pressure driver gas, 4, which is compressed air or other compressed gas containing appreciable oxygen gas;
 b. a means for containing, 7, a charge of the high pressure driver gas;
 c. a means for containing, 1, a portion of pulverized char fuel;
 d. a means for reloading another portion of pulverized fuel into the fuel container, 1, of which only the reload outlet, 14, is shown in FIG. 5;
 e. a dispersing nozzle passage, 10, comprising a nozzle inlet, 11, and a nozzle outlet, 12, connected into the combustion chamber, 5;
 f. a pilot injector means, 29, for injecting a quantity of ignitable fuel into the driver gas container, 7, from a source, 31;
 g. a spark igniter means, 30, for firing an electric spark within the driver gas container, 7, and comprising an energizing source, 32;
 h. a combined connecting means, 43, rotatable via the drive lever, 44, and shown in FIG. 5 in the position to connect the driver gas source, 4, to the driver gas container, 7, as well as to connect the pulverized fuel container, 1, to the driver gas container, 7; following pilot injection of ignitable fuel and ignition and burning thereof, the drive lever, 44, is moved to the dashed outline position, 45, which connects the driver gas container, 7, and the pulverized fuel container, 1, to the inlet, 11, of the dispersing nozzle, 10, so that pulverized fuel injection occurs; following injection the drive lever, 44, is moved to the dashed outline position, 46, which connects the pulverized fuel container, 1, to the reload outlet, 14, so that reloading of pulverized fuel for the next combustion can take place; note that the drive gas source, 4, is disconnected from the driver gas container, 7, before pilot injection and ignition occur and backflow is thus prevented;
 i. a drive means, not shown in FIG. 5, to drive the lever, 44, the pilot injector, 29, and the ignition means, 30, to carry out the injection process described above.

This preferred FIG. 5 form of pulverized fuel injector of this invention has the advantage of mechanical simplicity resulting from the combining of several connecting means into the single connecting means, 43. Note also that in this FIG. 5 example, the inlet and outlet of the driver gas container, 7, are combined and also the reloading inlet of the pulverized fuel container is combined with the injection outlet thereof. Hence, the terms inlet and outlet for an element may sometimes be common or interchangeable.

For an internal combustion engine burning dry pulverized char fuel we prefer to inject the pulverized fuel rather early during the engine compression stroke, not only so that more time is available for fuel particle burnup, but also so that interior pore burning can occur. With fuel particles thusly injected early during compression, the pressure rise of subsequent continued compression forces combustion air into the fuel particle pore spaces where rapid combustion reaction occurs over the very large internal pore area. During the following engine expansion, the combustion gases formed inside the pore spaces flow out and undergo complete burning outside the pore spaces. In this way more rapid and complete burning of the char fuel particles is achieved. In principle, pulverized fuel injection could be timed to occur just after completion of the engine intake process but such early injection invites fuel particle losses due to impingement upon and capture by the lubricating oil film on the engine cylinder wall. Hence, in practice fuel particle injection timing is set as early in the compression stroke as possible without incurring appreciable fuel particle losses to impingement.

One example engine arrangement for such pulverized fuel injection early during compression is shown partially in FIG. 6 and comprises a pulverized fuel injector, 47, mounted part way down the engine cylinder, 48, so that the engine piston, 49, covers up the injector, 47, after completion of fuel injection. In this way, the fuel injector, 47, is protected from the higher pressures and temperatures of the later portions of compression and earlier portions of expansion.

One example of a mechanical drive means for the driving of the means for connecting, and the reload means and the pilot injector means and the spark igniter means, if used, is shown partially in FIG. 3 and comprises the following elements:

1. a cam, 25, driven by the engine camshaft or crankshaft in the direction, 50, and comprising a raised section, 51, of angular extent, 52;
 2. a cam follower, 26, connected to the handle, 24, of a connecting means, or a pilot injector means, or a spark igniter means, and driven in the direction, 53, when the raised cam section, 51, passes under the follower, 26, and driven in the direction 54, to remain on the surface of the cam, 25, by the return spring, 55.

With these arrangements the element connected at, 24, is driven as required to carry out the injection process in the intended time order as described hereinabove. A single cam with several followers can be used or several cams each with a separate follower can be used. For a four-stroke cycle internal combustion engine the following table lists one illustrative example of cam timing in terms of camshaft angles measured from the lifter position when the engine piston is at top dead center at the end of the compression stroke:

| Drive Function | Approximate shaft angle, degrees |
| --- | --- |
| Fuel container to reload | 90° |
| Fuel quantity adjusted | 90° to 135° |
| Reload ram driven | 135° to 180° |
| Fuel container to driver gas container | 180° |
| Driver gas into driver container | 180° to 315° |
| Pilot injection | 300° |
| Spark ignition | 315° |
| Fuel container to nozzle | 315° to 330° |

This example cam timing yields pulverized fuel injectio at between 45 degrees to 30 degrees before piston top dead center during the engine compression stroke. Other cam and injection timings can be used and the optimum timing for pulverized fuel injection is best determined experimentally for best engine efficiency.

The pulverized fuel injectors of this invention can be used to inject any of various types of char or other fuel such as coal, coke, charcoal, wood, petroleum coke, etc. Usually, it will be preferred, however, to use devolatilized char fuels largely free of volatile matter, such as coke or charcoal. When a char fuel containing appreciable volatile matter is injected into an engine for combustion, the gasification of the volatile matter must precede the the commencement of burning of the fixed carbon portion of the fuel. Hence, the time available for the burnup of the fixed carbon is shortened by the time devoted to gasification of the volatile matter. But it is the burnup of the fixed carbon which is the slowest process, and this should be started as early as possible. By using devolatilized char fuels, the time available for burnup of the pulverized fuel particle fixed carbon is maximized.

The pulverized fuel injectors of this invention are particularly well suited for use with internal combustion engines for burning pulverized solid fuels. Additionally, these pulverized char fuel injectors can also be used on other types of combustion chambers, such as for steam boilers or gas turbine engines, where pulsating combustion can be utilized.

Having thus described my invention, what I claim is:

1. A machine for injecting pulverized char fuels into a combustion chamber at the start of each combustion process therein and comprising:

means for containing a portion of pulverized char fuel and comprising a container inlet and a container outlet;

a source of high pressure driver gas;

a source of pulverized char fuel particles;

means for containing a charge of high pressure driver gas and comprising a driver inlet and a driver outlet;

a dispersing nozzle passage comprising a nozzle inlet and a nozzle outlet connected to said combustion chamber;

means for reloading another portion of pulverized char fuel from said source of pulverized char fuel into said means for containing a portion of pulverized char fuel and comprising a reload outlet;

means for connecting said driver inlet to said source of high pressure driver gas;

means for connecting said container for pulverized fuel to said reload outlet;

means for connecting said container inlet to said driver outlet;

means for connecting said container outlet to said nozzle inlet;

means for driving all of said several means for connecting and said means for reloading so that an injection process occurs at the start of each said combustion process in said combustion chamber, said injection process comprising the following steps carried out in the following time order, first connect said container for pulverized fuel to said reload outlet and reload a portion of pulverized fuel into said containing means therefor, second disconnect said container for pulverized fuel from said reload outlet and connect said container inlet to said driver outlet and connect said driver inlet to said source of high pressure driver gas, third connect said container outlet to said nozzle inlet, fourth disconnect said container outlet from said nozzle inlet, fifth disconnect said driver inlet from said source of high pressure driver gas at some time between connecting said container outlet to said nozzle inlet and disconnecting said container outlet from said nozzle inlet.

2. A machine for injecting pulverized char fuels into a combustion chamber at the start of each combustion process therein, as described in claim 1:

wherein said means for driving so drives all of said means for connecting that said driver inlet is disconnected from said source of high pressure driver gas while said container outlet is being connected to said nozzle inlet.

3. A machine for injecting pulverized char fuels into a combustion chamber at the start of each combustion process therein, as described in claim 2:

wherein said means for reloading further comprises means for adjusting the quantity of pulverized fuel reloaded into said means for containing a portion of pulverized fuel.

4. An internal combustion engine capable of burning pulverized char fuels comprising:

an internal combustion engine mechanism comprising a combustion chamber;

a machine for injecting pulverized char fuels into said combustion chamber of said internal combustion engine at the start of each combustion process therein as described in claim 3.

5. An internal combustion engine capable of burning pulverized char fuels as described in claim 4:

wherein said machine for injecting pulverized char fuels injects said pulverized char fuels early during each compression process of said internal combustion engine mechanism.

6. An internal combustion engine capable of burning pulverized char fuels comprising:

an internal combustion engine mechanism comprising a combustion chamber;

a machine for injecting pulverized char fuels into said combustion chamber of said internal combustion engine at the start of each combustion process therein as described claim 2.

7. An internal combustion engine capable of burning pulverized char fuels as described in claim 6:

wherein said machine for injecting pulverized char fuels injects said pulverized char fuels early during each compression process of said internal combustion engine mechanism.

8. A machine for injecting pulverized char fuels into a combustion chamber at the start of each combustion process therein, as described in claim 1:

wherein said driver gas contains appreciable oxygen gas;

and further comprising:

a source of ignitable fuel;

means for injecting a quantity of ignitable fuel from said source of ignitable fuel into said means for containing a charge of high pressure driver gas;

means for firing an electric spark inside said means for containing a charge of high pressure driver gas;

means for stopping backflow of gas from said driver inlet toward said source of high pressure driver gas;

and wherein said means for driving all of said means for connecting also drives said means for injecting an ignitable fuel and said means for firing a spark so that ignitable fuel injection followed by an electric spark take place after each connection of said container inlet to said driver outlet and before connection of said container outlet to said nozzle inlet.

9. A machine for injecting pulverized char fuels into a combustion chamber at the start of each combustion process therein, as described in claim 8:

wherein said means for reloading further comprises means for adjusting the quantity of pulverized fuel reloaded into said means for containing a portion of pulverized fuel.

10. An internal combustion engine capable of burning pulverized char fuels comprising:
   an internal combustion engine mechanism comprising a combustion chamber;
   a machine for injecting pulverized char fuels into said combustion chamber of said internal combustion engine at the start of each combustion process therein as described in claim 9.

11. An internal combustion engine capable of burning pulverized char fuels as described in claim 10:
   wherein said machine for injecting pulverized char fuels injects said pulverized char fuels early during each compression process of said internal combustion engine mechanism.

12. An internal combustion engine capable of burning pulverized char fuels comprising:
   an internal combustion engine mechanism comprising a combustion chamber;
   a machine for injecting pulverized char fuels into said combustion chamber of said internal combustion engine at the start of each combustion process therein as described in claim 8.

13. An internal combustion engine capable of burning pulverized char fuels as described in claim 12:
   wherein said machine for injecting pulverized char fuels injects said pulverized char fuels early during each compression process of said internal combustion engine mechanism.

14. A machine for injecting pulverized char fuel into a combustion chamber at the start of each combustion process therein as described in claim 1:
   wherein said driver gas contains appreciable oxygen gas and sufficient fuel gas to be spark ignitable;
   and further comprising:
   means for firing an electric spark inside said means for containing a charge of high pressure driver gas;
   means for stopping backflow of gas from said driver inlet toward said source of high pressure driver gas;
   and wherein said means for driving all of said means for connecting also drives said means for firing a spark so that an electric spark is fired into said driver gas after each connection of said container inlet to said driver outlet and before connection of said container outlet to said nozzle inlet.

15. A machine for injecting pulverized char fuels into a combustion chamber at the start of each combustion process therein, as described in claim 14:
   wherein said means for reloading further comprises means for adjusting the quantity of pulverized fuel reloaded into said means for containing a portion of pulverized fuel.

16. An internal combustion engine capable of burning pulverized char fuels comprising:
   an internal combustion engine mechanism comprising a combustion chamber;
   a machine for injecting pulverized char fuels into said combustion chamber of said internal combustion engine at the start of each combustion process therein as described in claim 15.

17. An internal combustion engine capable of burning pulverized char fuels as described in claim 16:
   wherein said machine for injecting pulverized char fuels injects said pulverized char fuels early during each compression process of said internal combustion engine mechanism.

18. An internal combustion engine capable of burning pulverized char fuels comprising:
   an internal combustion engine mechanism comprising a combustion chamber;
   a machine for injecting pulverized char fuels into said combustion chamber of said internal combustion engine at the start of each combustion process therein as described in claim 14.

19. An internal combustion engine capable of burning pulverized char fuels as described in claim 18:
   wherein said machine for injecting pulverized char fuels injects said pulverized char fuels early during each compression process of said internal combustion engine mechanism.

20. A machine for injecting pulverized char fuels into a combustion chamber at the start of each combustion process therein, as described in claim 1:
   wherein said means for reloading further comprises means for adjusting the quantity of pulverized fuel reloaded into said means for containing a portion of pulverized fuel.

21. An internal combustion engine capable of burning pulverized char fuels comprising:
   an internal combustion engine mechanism comprising a combustion chamber;
   a machine for injecting pulverized char fuels into said combustion chamber of said internal combustion engine at the start of each combustion process therein as described in claim 20.

22. An internal combustion engine capable of burning pulverized char fuels as described in claim 21:
   wherein said machine for injecting pulverized char fuels injects said pulverized char fuels early during each compression process of said internal combustion engine mechanism.

23. An internal combustion engine capable of burning pulverized char fuels comprising:
   an internal combustion engine mechanism comprising a combustion chamber;
   a machine for injecting pulverized char fuels into said combustion chamber of said internal combustion engine at the start of each combustion process therein as described in claim 1.

24. An internal combustion engine capable of burning pulverized char fuels as described in claim 23:
   wherein said machine for injecting pulverized char fuels injects said pulverized char fuels early during each compression process of said internal combustion engine mechanism.

* * * * *